United States Patent
Hanson et al.

(10) Patent No.: US 11,756,581 B1
(45) Date of Patent: Sep. 12, 2023

(54) POSITION AND RISK RECONSTRUCTION IN SHINGLED MAGNETIC RECORDING DATA STORAGE DEVICES

(71) Applicant: Western Digital Technologies, Inc., San Jose, CA (US)

(72) Inventors: Weldon M. Hanson, Rochester, MN (US); Alain Chahwan, Irvine, CA (US); Niranjay Ravindran, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/703,318

(22) Filed: Mar. 24, 2022

(51) Int. Cl.
*G11B 5/596* (2006.01)
*G11B 5/56* (2006.01)
*G11B 5/012* (2006.01)

(52) U.S. Cl.
CPC .......... *G11B 5/59688* (2013.01); *G11B 5/012* (2013.01); *G11B 5/59627* (2013.01)

(58) Field of Classification Search
CPC ... G11B 27/36; G11B 5/012; G11B 20/10305; G11B 20/10314; G11B 2220/2516; G11B 20/10388; G11B 5/5543; G11B 20/1816; G11B 5/56; G11B 5/58; G11B 5/59633
USPC .................................... 360/75, 77.01, 77.06
See application file for complete search history.

(56) References Cited

U.S. PATENT DOCUMENTS

| | | |
|---|---|---|
| 8,837,065 B1 | 9/2014 | Mircea et al. |
| 9,059,737 B2 | 6/2015 | Coker et al. |
| 9,093,122 B1 * | 7/2015 | Mircea ............ G11B 20/10305 |
| 9,632,863 B2 | 4/2017 | Galbraith et al. |
| 10,176,849 B1 | 1/2019 | Qiang et al. |
| 10,275,166 B2 | 4/2019 | Shen et al. |
| 10,643,668 B1 | 5/2020 | Poudyal et al. |
| 10,699,745 B1 * | 6/2020 | Ide ..................... G11B 5/59627 |
| 10,748,567 B1 | 8/2020 | Zaitsu et al. |
| 2015/0055242 A1 | 2/2015 | Eldrss et al. |
| 2016/0372143 A1 | 12/2016 | Qiang et al. |
| 2017/0229141 A1 | 8/2017 | Ide et al. |

OTHER PUBLICATIONS

Wu et al., "Improving Runtime Performance of Deduplication System with Host-Managed SMR Storage Drives", DOI: 10.1109/DAC.2018.8465941, Sep. 20, 2018, 3 pages.

* cited by examiner

*Primary Examiner* — Nabil Z Hindi
(74) *Attorney, Agent, or Firm* — Neugeboren O'Dowd PC

(57) ABSTRACT

Various illustrative aspects are directed to a data storage device comprising data tracks N and N−1, and one or more processing devices, configured to measure signal to noise ratio (SNR) metrics for corresponding sectors of at least one of the data tracks N−1 and N, where the measuring is based at least in part on reading one or more of the data tracks N and N−1 using one or more read offsets, estimate a position of at least one of the data tracks based on measuring the one or more SNR metrics, and reconstruct one or more of risk values for at least a portion of the data track N−1 based on the one or more SNR metrics for the data track N−1, and a position error signal (PES) for at least one of the data tracks N−1 and N based on the corresponding estimated positions.

22 Claims, 5 Drawing Sheets

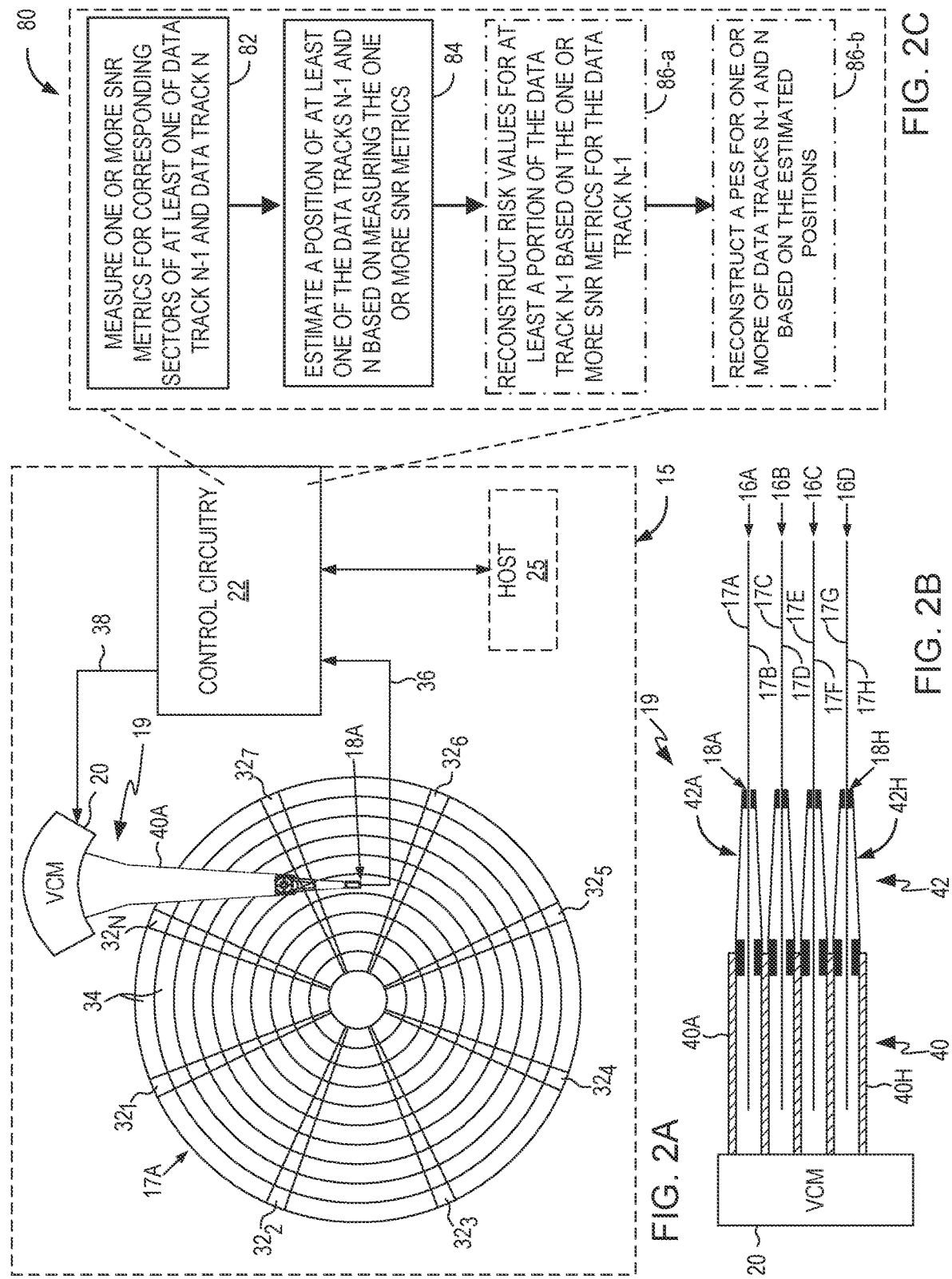

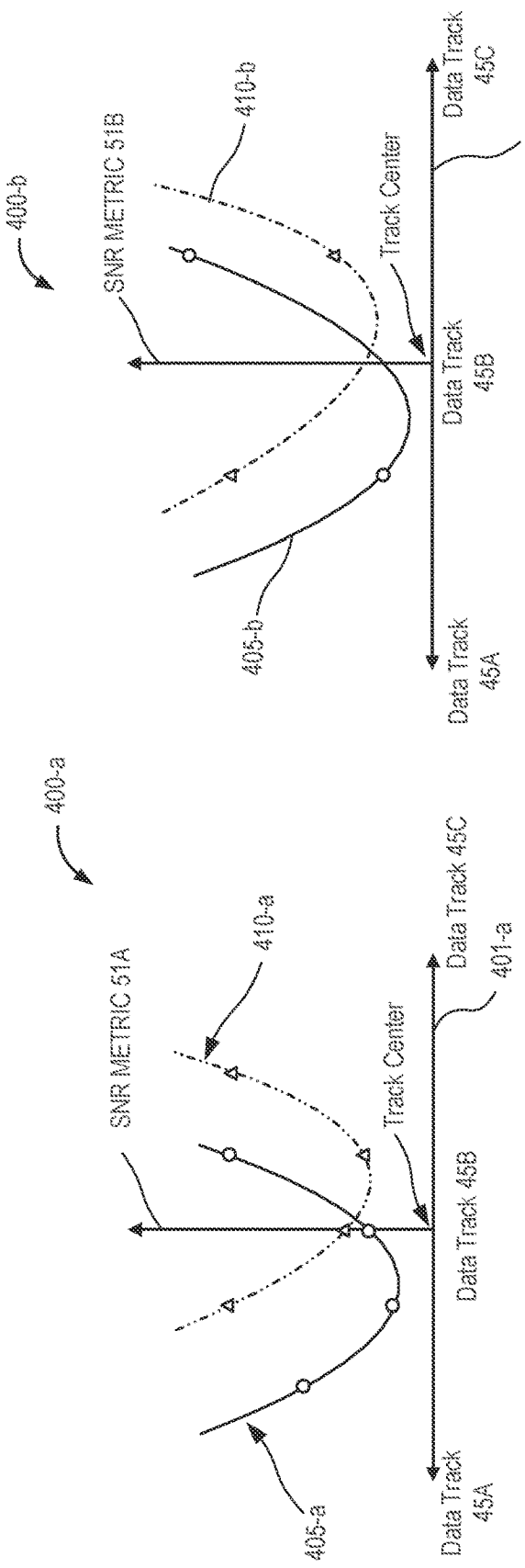
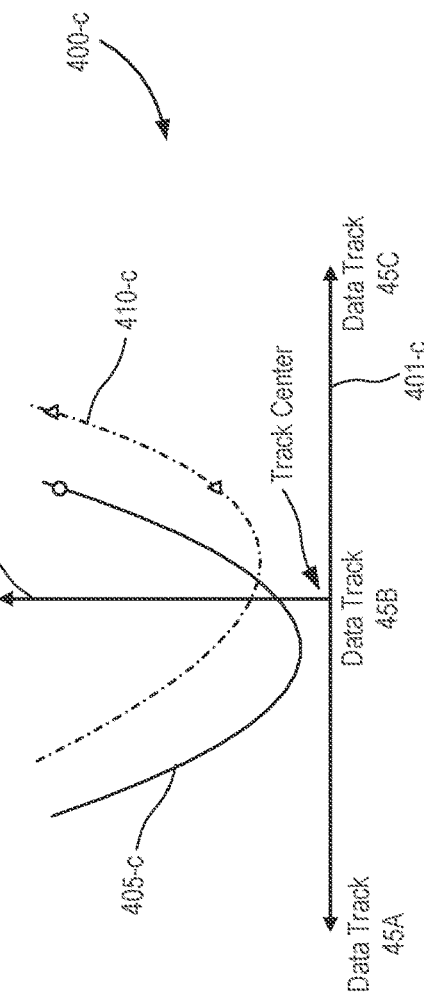
FIG. 4A
FIG. 4B
FIG. 4C
Legend
○ Measurement(s) of first sector
△ Measurement(s) of second sector

POSITION AND RISK RECONSTRUCTION IN SHINGLED MAGNETIC RECORDING DATA STORAGE DEVICES

BACKGROUND AND FIELD OF THE INVENTION

Data storage devices such as disk drives comprise one or more disks, and one or more read-write heads connected to the distal ends of actuator arms. The read-write heads are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write-read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some circumstances, loss of drive power to a hard disk drive (HDD) may result in user data loss since the HDD may have insufficient energy to move operational data from a volatile memory such as DRAM to non-volatile memory such as flash memory. In such cases, the lost operational data may include the track misregistration (TMR) values of shingled magnetic recording (SMR) writes and the risk values, where the risk values represent the damage (if any) to the trimmed edge of a data track. The loss of write position error signal (PES) data during power loss may result in the servo positioning system being unable to properly estimate the prior data track's write location, for instance, to provide accurate write inhibit feed forward and/or read position estimates during following HDD operations. Loss of risk data may also prevent the servo from calculating or estimating the accumulated damage to the prior data track to inform write abort decisions.

Generally, aspects of the present disclosure are directed to measuring one or more signal to noise ratio (SNR) metrics for a data track (e.g., a prior data track) for estimating the position of the data track and another data track adjacent to the data track and using the estimated positions to reconstruct a risk equation for the data track. In this way, the present disclosure may allow a table (or other data structure) of estimated PES and/or risk to be reconstructed and the lost dynamic random-access memory (DRAM)/non-volatile memory entries representing the sector squeeze risk to be replaced using one or more SNR measurements. This may serve to reduce the probability for one or more of a) hard error occurrence, especially for SMR open edges b) data replication protocol (DRP) latency during track reads and c) write aborts during future write operations, as compared to the prior art. As such, the present disclosure may enhance reliability of the written data, as well as allow for HDD operation at higher tracks per inch (TPI), in relation to the prior art.

Various illustrative aspects are directed to a data storage device comprising a disk comprising a plurality of data tracks, including a data track N and a data track N−1, a head actuated over the disk, and one or more processing devices configured to, measure one or more signal to noise ratio metrics for corresponding sectors of at least one of the data track N−1 and the data track N, where the measuring is based at least in part on reading one or more of the data track N and the data track N−1 using one or more read offsets, estimate a position of at least one of the data track N and the data track N−1, where estimating the position is based at least in part on measuring the one or more SNR metrics; and reconstruct one or more of: one or more risk values for at least a portion of the data track N−1 based on the one or more SNR metrics for the data track N−1, and a position error signal for at least one of the data track N−1 and the data track N based on the corresponding estimated positions.

Various illustrative aspects are directed to a method of operating a data storage device, the method comprising measuring one or more signal to noise ratio metrics for corresponding sectors of at least one of a data track N−1 and a data track N, where the measuring is based at least in part on reading one or more of the data track N and the data track N−1 using one or more read offsets, estimating a position of at least one of the data track N and the data track N−1, where estimating the position is based at least in part on measuring the one or more SNR metrics, and reconstructing one or more of: one or more risk values for at least a portion of the data track N−1 based on the one or more SNR metrics for the data track N−1, and a PES for at least one of the data track N−1 and the data track N based on the corresponding estimated positions.

Various illustrative aspects are directed to one or more processing devices comprising means for measuring one or more SNR metrics for corresponding sectors of at least one of a data track N−1 and a data track N, where the measuring is based at least in part on reading one or more of the data track N and the data track N−1 using one or more read offsets, means for estimating a position of at least one of the data track N and the data track N−1, where estimating the position is based at least in part on measuring the one or more SNR metrics, and means for reconstructing one or more of: one or more risk values for at least a portion of the data track N−1 based on the one or more SNR metrics for the data track N−1, and a PES for at least one of the data track N−1 and the data track N based on the corresponding estimated positions.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

FIG. 2C illustrates a method that a data storage device may perform, execute, and implement, in accordance with aspects of the present disclosure.

FIG. 4A illustrates an example of a graph generated from multiple measurement positions for estimating the center positions of sectors of a data track, in accordance with aspects of the present disclosure.

FIG. 4B illustrates another example of a graph generated from two measurement positions for a coarse estimation of the center position, in accordance with aspects of the present disclosure.

FIG. 4C illustrate another example of a graph generated using one or more measurement positions on an aggressor side of a first data track for identifying the track misregistration (TMR) excursion toward a second, adjacent, data track and/or for estimating a compensation for squeeze margin, in accordance with aspects of the present disclosure.

DETAILED DESCRIPTION

Figure 1:
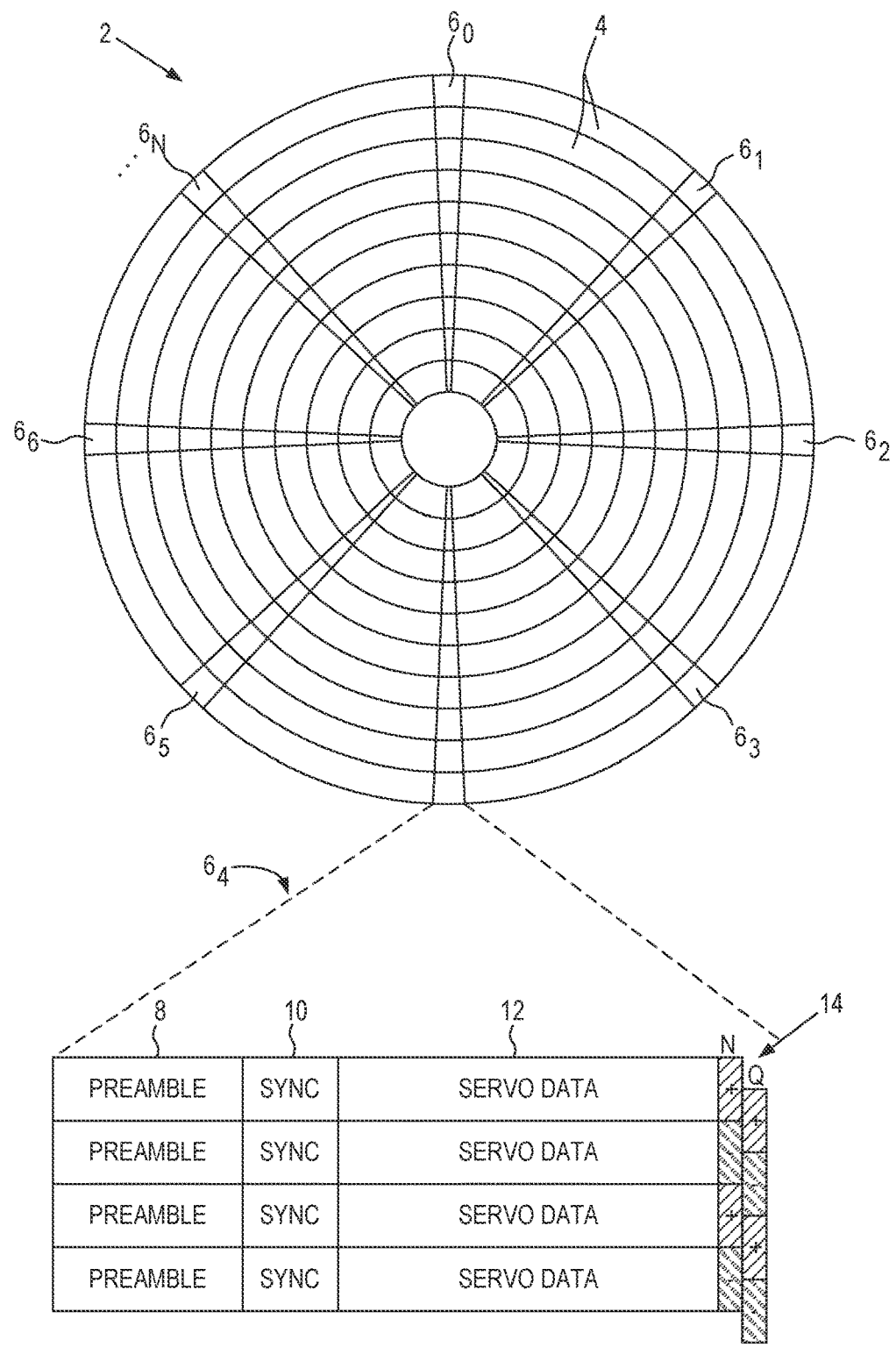
FIG. 1 shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

HDDs typically have disks with data tracks with a fixed track spacing or pitch that is set during manufacturing and cannot be changed during the life of the HDD. The positioning of the read/write heads to the data tracks is accomplished by servo tracks that have angularly-spaced servo sectors that contain head positioning information. The servo sectors extend radially across the data tracks. The read head detects the positioning information as the disk rotates and passes the position information to a servo control system to maintain the head on the desired data track. The servo tracks also have a fixed track pitch that is set during manufacturing and that may be different from the fixed track pitch of the data tracks.

A read head following a particular position with respect to a servo track during writing may be subject to various disturbances, such as internal and external vibration. This may cause the write head to be off track when the data sectors are written in the data tracks. During readback this results in a misalignment between the read head position and the position where the data track was actually written. This is true even if the read head is in its ideal position with respect to the servo track. This discrepancy between written position and the read head positioning during readback is referred to as track misregistration (TMR). TMR results in readback data errors and is a major detractor from achieving the highest possible areal densities and high throughput in modern HDDs. The data errors may possibly be recoverable in a re-read of the data, but this increases the time to retrieve the data; or they may not be recoverable, resulting in hard errors.

As previously described, in hard disk drives or HDDs, loss of drive power may leave the HDD with a limited amount of energy to migrate data in volatile memory (e.g., DRAM) to non-volatile memory such as flash memory. In some circumstances, HDD's store TMR information of shingled magnetic recording (SMR) writes in dynamic-random access memory or DRAM. This information may be utilized in subsequent writes, for instance, in write feed forward to optimize TMR. Additionally, or alternatively, HDDs store risk values, where the risk values represent the damage to the trimmed edges of one or more data tracks. In some instances, loss of write PES data (e.g., at or during power loss) may result in the servo system being unable to accurately estimate the prior data track's write location. In such cases, the servo system may also be unable to provide accurate write inhibit feed forward information and/or read position estimates during subsequent HDD operations. For instance, during read, the HDD may be configured to estimate the read trajectory to minimize or reduce off-track read errors, where the estimation is based on the write PES. Additionally, or alternatively, loss of risk data may also prevent the servo from calculating the accumulated expected damage to a previously written data track, which may be used for write abort decisions. This may result in increased write squeeze for the open edge data tracks and increased data recovery procedure (DRP) latency during data track reads. In some circumstances, the probability of a hard error occurring for SMR open edges may also increase.

To address some or all of the above issues, currently used HDDs often assume worst-case risk, which results in frequent aborts in subsequent write operations. Aspects of the disclosure enable the HDD to reconstruct one or more of the SMR PES and risk values following power loss, thus allowing for operation at higher tracks per inch (TPI). Typically, for a "well-behaved" host, the HDD retains one or more of the position error signal (PES) and risk in the volatile memory such as DRAM during track write, and uses this information for adjustment of the write trajectory and write inhibit algorithms, since such hosts have a "manageable" number of open SMR regions. For "non-well behaved" hosts, however, the amount of PES or risk data that needs to be stored at the instance of power loss may be quite large (e.g., a few gigabytes), since such hosts may have thousands of open SMR regions. In some instances, a "well behaved" host may allow up to 40 open SMR regions, up to 128 open SMR regions, up to 256 open SMR regions, etc., while a "non-well behaved" host may have upwards of 20,000 open SMR regions on a drive.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator arm assembly 19 (also referred to as, actuator assembly 19), and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 (also referred to as disk heads 18) may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

FIG. 2A also depicts servo sectors 32 (e.g., servo sectors 32, through 32N) written onto disk surfaces 17. In some cases, when manufacturing a disk drive, servo sectors 32 may be written to disk surfaces 17 to define a plurality of evenly-spaced, concentric tracks 34, where each of the tracks 34 comprises a track centerline. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. In the example of FIG. 2A, the control circuitry 22 processes read signals 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate a VCM control signal 38 applied to the VCM 20 which rotates the actuator arm 40 about a pivot in order to actuate the head 18 radially over the disk 16 in a direction that reduces the PES. In some examples, the disk drive may also comprise a suitable microactuator, such as a suitable piezo-electric (PZT) element for actuating the head 18 relative to a suspension 42 (e.g., topmost suspension 42A, lowest suspension 42H), or for actuating a suspension relative to the actuator arm 40. The servo sectors 321-32N may comprise any suitable head position information, such as a track address for coarse positioning and servo bursts for fine positioning. The servo bursts may comprise any suitable pattern, such as an amplitude-based servo pattern or a phase-based servo pattern.

In some examples, the control circuitry 22 is configured to execute the flow diagram 80 of FIG. 2C. At step 82, the control circuitry 22 measures one or more SNR metrics for corresponding data sectors of at least one of a first data track, N-1, and a second data track, N. In some embodiments, the first and the second data tracks N-1 and N are adjacent or consecutive data tracks written using shingled magnetic recording (SMR). Further, at step 84, the control circuitry 22 estimates a position of at least one of the data tracks N-1 and N based on measuring the one or more SNR metrics.

Estimating the position of the second data track (N data track) may comprise estimating one or more of the untrimmed/open edge of the second data track and the track center, such as a write track center, of the second data track. Similarly, estimating the position of the first data track, N−1, may comprise estimating the position of the untrimmed/open edge of the data track N−1, the track center of the untrimmed and/or trimmed portions of the data track N−1, and optionally, the position of the trimmed edge of the data track N−1. At steps 86-*a* and 86-*b*, the control circuitry 22 is configured to reconstruct at least one of: risk values for at least a portion of the first data track, N−1, based on the one or more SNR metrics for the data track N−1 (86-*a*) and a PES for at least one of the data track N−1 and the data track N based on the corresponding estimated positions. It should be noted that, in some examples, one of the steps 86-*a* or 86-*b* may be optional, as shown by the dash-dot lines.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the back electromotive force (BEMF) voltage generated by the VCM 20 during a calibration seek (where the BEMF voltage represents an estimated velocity of the VCM). The bootstrap spiral track is then written to the disk using the feedforward compensation.

Figure 3A:
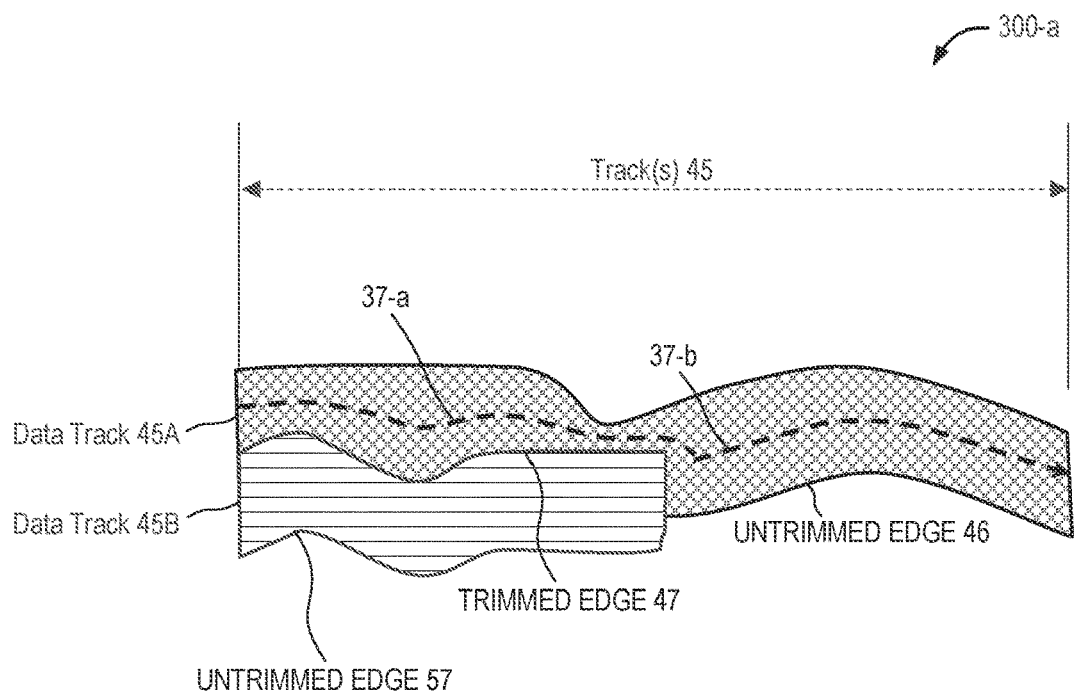
FIG. 3A shows an example of data tracks written using shingled magnetic recording (SMR), in accordance with aspects of the present disclosure.

FIG. 3A shows an example 300-*a* of adjacent data tracks, including a trimmed edge, an open edge, and a track center of one of the data tracks, in accordance with aspects of the present disclosure. In this example, two previously written and adjacent or consecutive data tracks 45A (or data track N−1) and 45B (or data track N) are shown. Here, the data tracks 45A and 45B are written using SMR. The track center of the shingled data track 45A is shown as track center 37. Further, the shingled data track 45A comprises a trimmed edge 47 and an untrimmed edge 46 (also referred to as open edge 46), where the trimmed edge 47 corresponds to an edge of data track 45A that has been trimmed as a result of writing data track 45B (N). In other words, data track 45A corresponds to a previously written data track having the track center 37. Further, data track 45B corresponds to a partially written data track that overlaps with a portion of the data track 45A. This overlapped portion or edge of data track 45A is shown as the trimmed edge 47, while the non-overlapping portion or edge of data track 45A is shown as the untrimmed/open edge 46.

As used herein, the term "track center" may be used to refer to a "write track center" or "write offset," or alternatively, a "read offset" or "read track center". For example, in FIG. 3A, the track center 37-*a* is the read offset for the trimmed portion of data track 45A, while the track center 37-*b* is the write track center/write offset for the untrimmed portion of the data track 45A. That is, the track center 37-*a* is the nominal read offset of the shingled portion of the data track 45A. It should be noted that, while the write track center for the trimmed portion of data track 45A is not shown, it may be below (i.e., towards the data track 45B in FIG. 3A) the read offset 37-*a*.

Figure 3B:
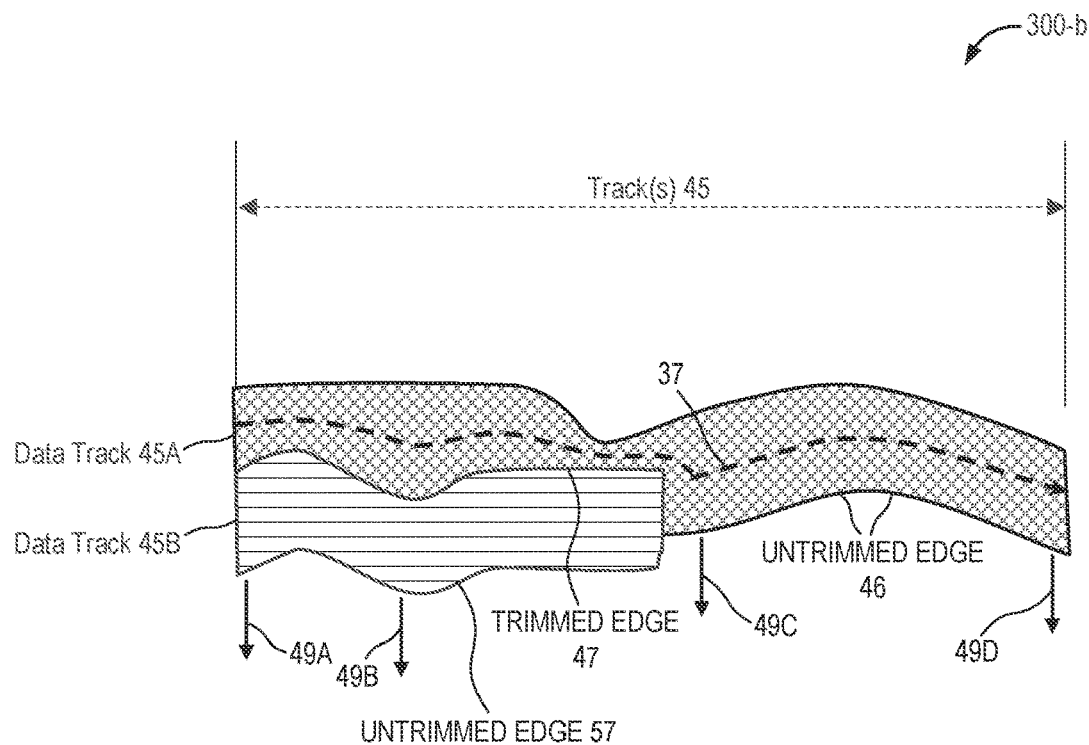
FIG. 3B shows an example of sectors of a data track that are offset and subject to squeeze during a track write on an adjacent data track, where the data tracks are written using SMR, in accordance with aspects of the present disclosure.

As seen in the embodiment (300-B) of FIG. 3B, the arrows 49A, 49B, 49C, and 49D indicate the sectors of the data track(s) 45A and 45B offset in the "N+1" direction that may be exposed to squeeze of a subsequent data track write. For example, some sectors along the open edge 46 of data track 45A may be subject to increased write squeeze if the control circuitry 22 continues to write data track 45B (N). In some circumstances, the open edge 46 may also have a higher probability for hard error occurrence during subsequent HDD operations.

In some examples, an off-track write toward a previously recorded data track (e.g., data track N−1 or 45A), for instance, while writing to data track N, may corrupt the data previously recorded in data track N−1 rendering one or more data sectors unrecoverable. Typically, writing to a data track is aborted when an excessive off-track condition is detected (i.e., when the PES exceeds a write abort threshold) so as to minimize the amount of data corrupted in the adjacent data tracks. The data track density (e.g., tracks per inch or TPI) and write abort threshold are typically configured to ensure the recoverability of the data sectors in the adjacent data tracks. In some cases, the term "track squeeze" refers to a degree or an amount of corruption to the data sectors of a data track (e.g., data track 45A) due to interference during write operations on an adjacent data track (e.g., data track 45B). In accordance with one or more aspects of the present disclosure, the control circuitry 22 is configured to reconstruct one or more of the estimated PES and the estimated risk to replace the lost entries (from volatile or non-volatile memory) representing sector squeeze risk. This enables the control circuitry 22 to continue writing to data track N, without assuming worst-case risk, as typically done in the prior art. As such, the present disclosure serves to reduce the number of aborts during subsequent write operations.

In some embodiments, a table of estimated PES and/or risk may be reconstructed using SNR measurements of a "bathtub measurement". Some non-limiting examples of SNR metrics include a bit error rate (BER), sector failure rate, mean squared error (MSE), log-likelihood ratio (LLR), parity equation errors, or 2T, 3T preamble SNR. These SNR metrics may be used to estimate the positions of previously written sectors along the data track (e.g., data track N−1 or 45A). Additionally, or alternatively, the SNR metrics may be mapped to a risk metric, where the risk metric indicates the level of squeeze per sector of a data track.

In some cases, the write position error relative to the read offset position (also referred to as read track center position) may be reconstructed by measuring each sector's position using a "bathtub test," as described below in relation to FIGS. 4A-4C. Further, the risk values corresponding to the shingled/trimmed portion of the N−1 data track may be assessed and the TMR for the open/untrimmed edge of the remainder of the N−1 data track and the written portion of the data track N may also be estimated, in accordance with aspects of the disclosure. The read offset applied to the measurement may be used to determine the center position of each data sector written along the untrimmed/open edge of each data track for characterizing and substituting for the write TMR. In some cases, the write position error may refer to the position error between the center position of the data sectors written as compared to a write target. Alternatively, the write position error refers to the position of a write offset relative to a write target, where the write offset is the position where the write actually happens. While reading back a previously written track, the read offset may be selected based on the center of the SMR track. Thus, in some cases, the read offset corresponds to the nominal center of a data track after shingling.

Turning now to FIG. 4A, which illustrates an example graph 400-*a* of a test (e.g., a "bathtub test") for estimating the center position of one or more sectors of a data track (e.g., data track N or 45B) with offset present. In some cases, the offset refers to the offset in the data sector's center position after being trimmed by the data track 45C write. For instance, the offset illustrated in curves 405-*a* and 410-*a* may result from write TMR occurring during the writing of data track 45B (N) and/or data track 45C (N+1). To account for this, write TMR, a read TMR or read offset error may be needed during readback, as shown by the measurement points corresponding to off-track read positions on either side of the track center. In FIG. 4A, the quadratic curves 405-*a* and 410-*a* represent the SNR profile of a data sector of the data track 45B (or data track N). In some cases, a plurality of measurement positions (5 in this example) may be used to plot the quadratic curve(s) 405-*a* and 410-*a* to estimate the center position of one or more sectors of the data track. As seen, the graph 400-*a* in FIG. 4A depicts SNR metrics 51A on the vertical or 'y' axis with respect to off-track positions on the 'x' axis 401-*a*. In this example, the intercept between the 'x' axis 401-*a* and the 'y' axis is the track center. In some cases, the offset from the 'y' axis for each of the points making up the quadratic curve may be measured by moving the head's read sensor to a read offset position (e.g., 0%, +/−5%, +/−10% magnitude relative to track pitch) along the 'x' axis. Here, the SNR metrics at multiple read offset measurement positions for different sectors are utilized to estimate the center positions of the data sectors along the data track. In this example, the quadratic curve 405-*a* corresponds to the SNR metric measurements for a first sector with respect to the off-track positions (e.g., relative to the track center of the data track N), while the quadratic curve 410-*a* corresponds to the SNR metric measurements for a second sector with respect to the off-track positions. While not necessary, in some cases, the read offset measurement positions for the data sectors may be symmetrical about the track center of the SMR data track.

As seen, the quadratic curve 410-*a* is shifted to the right of the track center of data track 45B (or data track N), which indicates that the data sector represented by quadratic curve 410-*a* is offset in the direction of the data track 45C (N+1 data track). In other words, the data sector represented by quadratic curve 410-*a* has a higher likelihood of being squeezed than the data sector represented by quadratic curve 405-*b* due to writing on the adjacent data track 45C (N+1 track).

FIG. 4B illustrates another example graph 400-*b*, where two positions at either side of the track center of data track 45B (or data track N) are used for a coarse estimate of the center position using a SNR metric 51B. Similar to FIG. 4A, the 'x' axis 401-*b* corresponds to the off-track positions, while the 'y' axis corresponds to the SNR metric 51B. That is, the measurement points illustrated on curves 405-*b* and 410-*b* correspond to the SNR metric measurements at various off-track read positions along the x-axis 401-*b*. As noted above, when an SNR measurement for a data sector is taken at an off-track position it means that the SNR measurement for the data sector is taken at an offset relative to the track center (or read offset) of the SMR data track. In some cases, the offset from the 'y' axis for each of the points making up the quadratic curves 405-*b* and 410-*b* may be measured by moving the head's read sensor to a read offset position (e.g., 0%, +/−5%, and +/−10% magnitude relative to track pitch) along the X axis. In SMR, the center position of a data sector of data track 45B may be offset due to being trimmed by a track write on data track 45C (N+1 data track). In this example, the quadratic curves 405-*b* and 410-*b* represent the SNR profiles for a first sector and a second sector, respectively, at two off-track positions. As seen, the quadratic curve 410-*b* is shifted to the right of the track center of data track 45B (data track N), which indicates that the data sector represented by quadratic curve 410-*b* is offset in the direction of the data track 45C (N+1 data track). In other words, the data sector represented by quadratic curve 410-*b* has a higher likelihood of being squeezed than the data sector represented by quadratic curve 405-*b* due to writing on the adjacent data track 45C (N+1 data track).

When reducing the number of read offsets for measurement of the SNR of the open edge, the read offsets in the direction of the data track 45C (N+1 track) are more important for identification of the sectors written toward the N+1 track, as these sectors are more likely to incur damage when shingle writing the remaining portion of the N track and N+1 track. In such cases, measurement points located to the right of the track center may be utilized to identify the center position of one or more data sectors along the open edge of a data track relative to the track center, as described below in relation to FIG. 4C.

FIG. 4C illustrates another example graph 400-*c* where one or two reads at a position on an aggressor side of the data track 45B (or data track N) are used, for instance, to identify the TMR excursion towards the N+1 (data track 45C) or the N+2 data track (not shown). Similar to FIGS. 4A and 4B, the 'x' axis 401-*c* corresponds to the off-track positions, while the 'y' axis corresponds to the SNR metric 51C. That is, the measurement points illustrated on curves 405-*c* and 410-*c* correspond to the SNR metric measurements at various off-track read positions along the x-axis 401-*c*. In this example, the quadratic curves 405-*c* and 410-*c* correspond to the SNR profiles for a first and a second data sector, respectively, of a data track N (or data track 45B) write. Further, the data sectors corresponding to the quadratic curves 405-*c* and 410-*c* may be positioned along the untrimmed portion of the data track N (45B). In this example, the measurement positions are located to the right of the track center of data track N (45B). As seen, TMR has placed the data sector represented by the quadratic curve 405-*c* to the left side of the track center (towards the data track N−1 or 45A), while the data sector represented by the quadratic curve 410-*c* is written on the right side of the track center. In some circumstances, the data sector corresponding to the quadratic curve 410-*c* may be subject to track squeeze from a future track write on data track 45C (N+1 data track).

In some cases, the control circuitry 22 may be configured to estimate the compensation for squeeze margin, for instance, based on the SNR metrics measured during reads on the aggressor side of the data track 45B. The control circuitry 22 may utilize the SNR measurements for each sector along the data track 45B to estimate the TMR to replace the lost information. This estimated TMR information is then used to estimate the amount of squeeze, as well as the risk information for the continuation of the write to the SMR zone's open edges of data track 45B and/or data track 45C.

Some aspects of the disclosure are directed to reconstructing the risk values lost during a power loss event, which enables identification of sectors that are more susceptible to data corruption due to track squeeze. In some examples, the control circuitry 22 performs read verify following power loss, or data loss of the PES, track center, and/or risk information, to determine if the data in a data track (e.g., data track N−1) can be read correctly. In some instances, at least one track read may be needed to measure each sector's position along the data track. As noted above, measuring the position of a sector may comprise determining one or more of the position of the track edge (e.g., untrimmed track edge) and the track center (e.g., track center of the trimmed and/or the untrimmed portion) of the data track. The location of the track edge along an untrimmed edge of a data track may be estimated using one or more of the SNR metrics described herein and elsewhere throughout the disclosure, such as, but not limited to, a bit error rate, sector failure rate, mean squared error (MSE), LLR, and parity equation errors. In some embodiments, the risk may be reconstructed by reading a data track (e.g., data track N−1) and measuring the BER, or other SNR metrics. Further, this risk information may be used as one input criteria for the remainder of the adjacent data track N write.

Figure 5A:
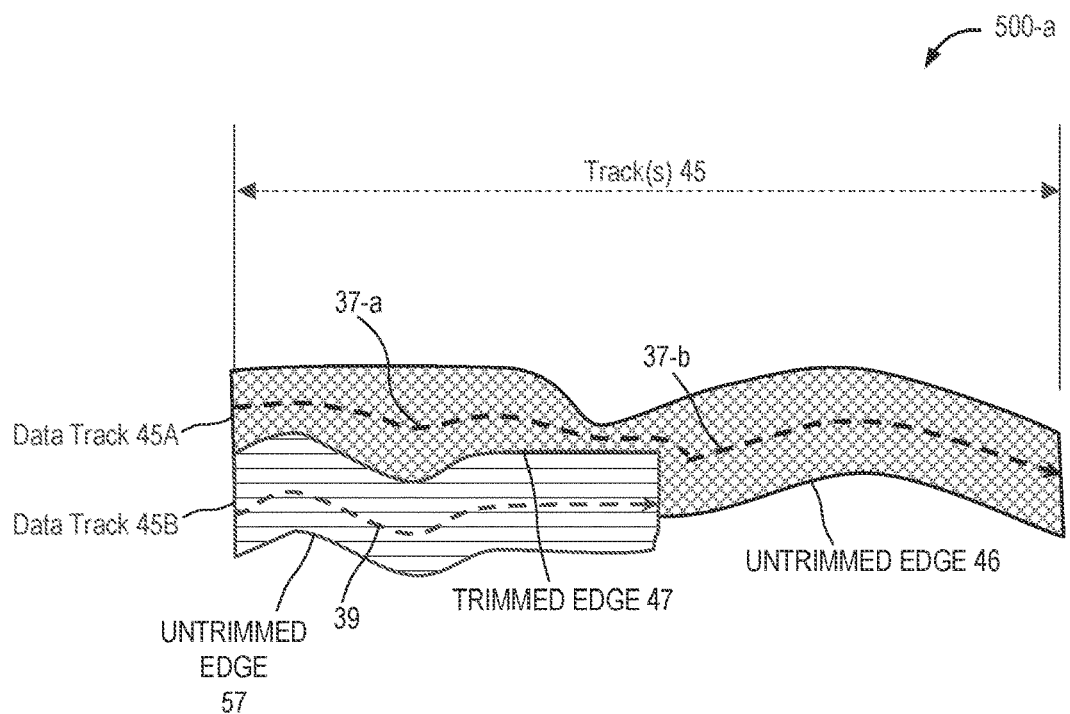
FIG. 5A shows an example of PES reconstruction and track center reconstruction for the data tracks in FIG. 3A, in accordance with aspects of the present disclosure.

FIG. 5A shows an example 500-a of adjacent SMR data tracks 45A and 45B. As seen, FIG. 5A depicts the locations of the respective track centers, as well as the trimmed and untrimmed/open edges of the data tracks. In this example, two adjacent or consecutive data tracks 45A (or data track N−1) and 45B (or data track N) are shown. Further, the data track 45A comprises a trimmed edge 47 and an untrimmed/open edge 46, where the trimmed edge 47 corresponds to the updated edge of data track 45A following writing data track 45B. FIG. 5A also depicts the read track center (or read offset) of the trimmed portion of data track 45A as track center 37-a. Further, the write track center (or write offset) of the untrimmed/open edge 46 of the data track 45A is shown as track center 37-b. Lastly, track center 39 corresponds to the write track center of the written data track 45B.

In some cases, the control circuitry 22 is configured to reconstruct the TMR, PES and/or track centers for one or more of the data tracks. Each of the data tracks may comprise one or more untrimmed (or open) and/or trimmed edges. In some cases, the PES and/or track center reconstruction may be based in part on the "bathtub" tests, previously described in relation to FIGS. 4A-4C. For instance, the control circuitry 22 may be configured to use the SNR metrics measured at different offsets, where the offsets are relative to the track center, to reconstruct the write position error for the data tracks N−1, N, etc. As noted above, the write TMR for the open edges of the data tracks N−1, N, may be estimated by determining each data sector's position using the SNR measurements. In this example, the track centers 37-a, 37-b, and 39 correspond to the track centers reconstructed by the control circuitry 22.

In some cases, the control circuitry 22 is configured to use this reconstructed position information (e.g., from the PES/track center reconstruction operation) for the track center 37-a while reading the data track 45A (N−1) using PES tracking. Additionally, the control circuitry 22 may utilize position information for the track center 37-b of the untrimmed/open edge portion of the data track 45A, for instance, while continuing the track write for data track N. The track centers 37-a and 37-b may also be referred to as trimmed and untrimmed track centers, respectively. Further, track center 39 may be referred to an untrimmed track center. The control circuitry 22 may also use the position information for the one or more data sectors along the untrimmed edge 46 of data track 45A for writing data track 45B. In some examples, at least one track read (e.g., 1 track, 2 track reads, 5 track reads, etc.) may allow position estimation of the individual data sectors with respect to the untrimmed edge for each SMR written data track. In some cases, the track center 37-b of data track 45A is associated with track write PES of the data track 45A. The control circuitry 22 may utilize the write PES of the untrimmed portion of data track 45A while reading back the data track 45A.

Similarly, the control circuitry 22 reconstructs the write track center 39 (untrimmed) of the data track 45B, as shown in FIG. 5A. In some cases, the PES for the track write of data track 45B is also reconstructed by the control circuitry 22 of the present disclosure. As noted above, the PES during a track write operation dictates or influences the write track center of a data track. For instance, the write track center of data track 45B is based on the track write PES for the data track 45B. In some cases, the control circuitry 22 is configured to utilize reconstructed position information pertaining to the write track center 39 and/or the track write PES of data track N (or 45B) for one or more of: writing the data track N+1 and reading back the data track N, where the reading is based on the PES tracking of data track N. In some cases, the control circuitry 22 may abort writing the data track N+1. For instance, the control circuitry 22 aborts writing data to data track N+1 if it determines that the data track N (or 45B) will be squeezed above a write abort threshold. Alternatively, the track write PES of data track 45B and/or the position information of the track center 39 may be utilized for target feedforward while writing the N+1 data track.

Figure 5B:
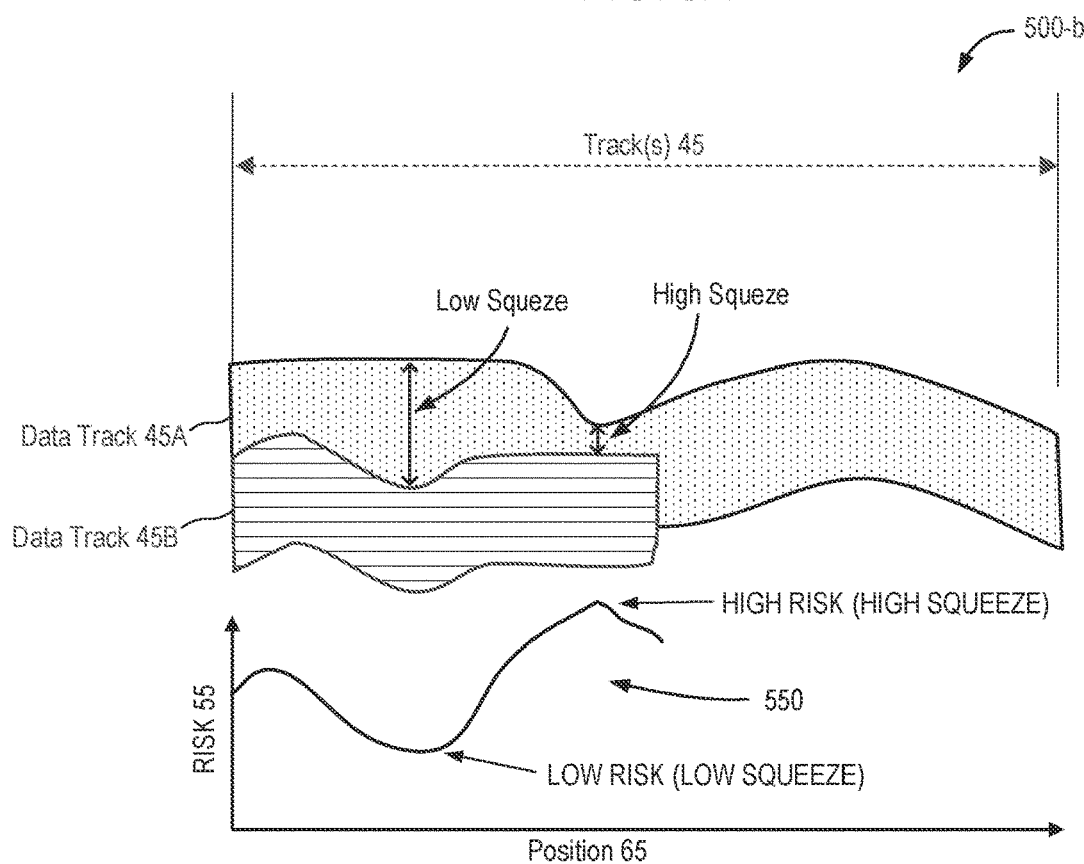
FIG. 5B shows an example of risk reconstruction for a data track, in accordance with aspects of the present disclosure.

In some instances, the SNR metrics (i.e., described in relation to at least FIGS. 4A-C) are mapped to risk metrics (or risk values), where the risk metrics indicate the level of track squeeze per data sector. FIG. 5B shows an example 500-b of adjacent data tracks, as well as a graph 550 of reconstructed risk values, according to various aspects of the disclosure. In this example, the control circuitry 22 has reconstructed risk values for at least a portion of the trimmed portion/edge of data track 45A. Graph 550 depicts the risk 55 on the vertical or 'y' axis with respect to position on the horizontal or 'x' axis, where the position is along the trimmed edge of the data track 45A. Further, FIG. 5B also depicts the sectors along the trimmed edge of the data track 45A and their relative risk (e.g., in terms of susceptibility to track squeeze). In some embodiments, the control circuitry 22 utilizes the information gained from the risk reconstruction, for instance, for abort decisions, as it continues writing data to data track 45B. For instance, after the control circuitry 22 performs read verify to determine whether it can adequately read the data stored in data track 45A, it may determine if there is a high risk of squeeze for the data track 45A if it continues writing data to data track 45B. If so, the data stored in the untrimmed portion of the data track 45A may be relocated to another portion of the disk drive. Relocating the data may comprise writing the data to another part of the disk, write caching it on the disk, write caching it in Random Access Memory (RAM), and/or write caching it on non-volatile memory such as flash memory, to name a few non-limiting examples. In this way, the data storage device of the present disclosure serves to reduce latency while recovering one or more previously written data sectors. In some cases, parity equations may be used to recover "unrecoverable" data sectors, such as data sectors that are associated with high risk/squeeze.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for reconstructing PES and/or risk for data storage, and other aspects of this disclosure. Persons skilled in the relevant fields of art will be well-equipped by this disclosure with an understanding and an informed reduction to practice of a wide panoply of further applications, architectures, techniques, and methods for reducing noise in BEMF sensing for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a disk comprising a plurality of data tracks, including a data track N and a data track N−1;
a head actuated over the disk; and
one or more processing devices configured to:
measure one or more signal to noise ratio (SNR) metrics for corresponding sectors of at least one of the data track N and the data track N−1, wherein the measuring is based at least in part on reading one or more of the data track N and the data track N−1 using one or more read offsets;
estimate a position of at least one of the data track N and the data track N−1, wherein estimating the position is based at least in part on measuring the one or more SNR metrics; and
reconstruct:
one or more risk values for at least a portion of the data track N−1, based on the one or more SNR metrics for the data track N−1, and wherein the one or more risk values correspond to a write abort threshold to abort writing data to the data track N, and
a position error signal (PES) for at least one of the data track N−1 and the data track N based on the corresponding estimated positions.

2. The data storage device of claim 1, wherein the data tracks N and N−1 are adjacent or consecutive data tracks.

3. The data storage device of claim 1, wherein the portion of the data track N−1 comprises a trimmed edge of the data track N−1, and wherein the one or more risk values are associated with sector squeeze for one or more sectors along the trimmed edge of the data track N−1.

4. The data storage device of claim 3, wherein the one or more processing devices are configured to:
evaluate the one or more risk values with respect to the write abort threshold to abort or continue writing data to the data track N.

5. The data storage device of claim 1, wherein estimating, by the one or more processing devices, the position of the data track N−1, comprises,
determining a trimmed track center for a trimmed edge of the data track N−1; and
determining an untrimmed track center for an untrimmed edge of the data track N−1.

6. The data storage device of claim 1, wherein, estimating, by the one or more processing devices, the position of the data track N, comprises:
determining a track center for a trimmed edge of the data track N.

7. The data storage device of claim 1, wherein the one or more SNR metrics comprise one or more of bit error rate (BER), sector failure rate, mean squared error (MSE), log-likelihood ratio (LLR), parity equation errors, 2T preamble SNR, and 3T preamble SNR.

8. The data storage device of claim 1, wherein the one or more processing devices are further configured to:
map the SNR metrics to a risk metric, the risk metric associated with a level of track squeeze per sector along a trimmed edge of the data track N−1.

9. The data storage device of claim 1, wherein the one or more processing devices are further configured to:
generate a target feed-forward control signal based on the estimated position of the data track N; and
one of:
continue writing to a data track N+1, based upon the target feed-forward control signal, wherein the data track N+1 is adjacent or consecutive to the data track N; or
abort writing to the data track N+1, based upon the target feed-forward control signal.

10. The data storage device of claim 1, wherein estimating, by the one or more processing devices, the position of the data track N−1 and the data track N, comprises,
estimating a position of an untrimmed edge of the data track N−1, and
estimating a position of an untrimmed edge of the data track N.

11. The data storage device of claim 10, wherein the one or more processing devices are further configured to:
estimate, for the data track N−1, a write position error relative to a read offset position by measuring a position of each sector along the untrimmed edge of the data track N−1; and
estimate, for the data track N, a write position error relative to a read offset position by measuring a position of each sector of data track N along the untrimmed edge of the data track N−1.

12. The data storage device of claim 1, further comprising:
an actuator arm assembly comprising one or more disk heads and a voice coil motor (VCM);
and wherein the one or more processing devices are further configured to control the actuator arm assembly to actuate the one or more disk heads over a disk surface of the disk to read the data tracks N and N−1 using the one or more read offsets.

13. A method of operating a data storage device, comprising:
measuring one or more signal to noise ratio (SNR) metrics for corresponding sectors of at least one of a data track N and a data track N−1, wherein the measuring is based at least in part on reading one or more of the data track N and the data track N−1 using one or more read offsets;
estimating a position of at least one of the data track N and the data track N−1, wherein estimating the position is based at least in part on measuring the one or more SNR metrics; and
reconstructing:
one or more risk values for at least a portion of the data track N−1, based on the one or more SNR metrics for the data track N−1, and wherein the one or more risk values correspond to a write abort threshold to abort writing data to the data track N, and
a position error signal (PES) for at least one of the data track N−1 and the data track N based on the corresponding estimated positions.

14. The method of claim 13, wherein the data tracks N−1 and N are adjacent or consecutive data tracks.

15. The method of claim 13, wherein the portion of the data track N−1 comprises a trimmed edge of the data track N-1, and wherein the one or more risk values are associated with sector squeeze for one or more sectors along the trimmed edge of the data track N-1.

16. The method of claim 15, further comprising:
evaluating the one or more risk values with respect to the write abort threshold to abort or continue writing data to the data track N.

17. The method of claim 13, wherein the one or more SNR metrics comprise one or more of bit error rate (BER), sector failure rate, mean squared error (MSE), log-likelihood ratio (LLR), parity equation errors, 2T preamble SNR, and 3T preamble SNR.

18. The method of claim 13, further comprising:
mapping the SNR metrics to a risk metric, the risk metric associated with a level of track squeeze per sector along a trimmed edge of the data track N-1.

19. One or more processing devices comprising:
means for measuring one or more signal to noise ratio (SNR) metrics for corresponding sectors of at least one of a data track N-1 and a data track N, wherein the measuring is based at least in part on reading one or more of the data track N and the data track N-1 using one or more read offsets;
means for estimating a position of at least one of the data track N and the data track N-1, wherein estimating the position is based at least in part on measuring the one or more SNR metrics; and
means for reconstructing:
one or more risk values for at least a portion of the data track N-1, based on the one or more SNR metrics for the data track N-1, and wherein the one or more risk values correspond to a write abort threshold to abort writing data to the data track N, and
a position error signal (PES) for at least one of the data track N-1 and the data track N based on the corresponding estimated positions.

20. A data storage device comprising:
a disk comprising a plurality of data tracks, including a data track N and a data track N-1;
a head actuated over the disk; and
a processing device configured to:
measure a signal to noise ratio (SNR) metric for corresponding sectors of the data track N and the data track N-1, wherein the measuring is based at least in part on reading the data track N and the data track N-1 using one or more read offsets;
estimate a position of the data track N and the data track N-1, wherein estimating the position is based at least in part on measuring the SNR metrics; and
reconstruct:
a risk value for at least a portion of the data track N-1, based on the SNR metric for the data track N-1, and wherein the risk value corresponds to a write abort threshold to abort writing data to the data track N, and
a position error signal (PES) for the data track N-1 and the data track N based on the corresponding estimated positions.

21. The data storage device of claim 20, wherein the data tracks N and N-1 are adjacent or consecutive data tracks.

22. The data storage device of claim 20, wherein the data tracks N and N-1 are shingled data tracks.

* * * * *